US011357010B2

(12) United States Patent
Zhu et al.

(10) Patent No.: US 11,357,010 B2
(45) Date of Patent: Jun. 7, 2022

(54) SENSOR ASSISTED BEAM MANAGEMENT

(71) Applicant: QUALCOMM Incorporated, San Diego, CA (US)

(72) Inventors: Jun Zhu, San Diego, CA (US); Mihir Vijay Laghate, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 75 days.

(21) Appl. No.: 16/908,355

(22) Filed: Jun. 22, 2020

(65) Prior Publication Data

US 2020/0404644 A1 Dec. 24, 2020

Related U.S. Application Data

(60) Provisional application No. 62/865,700, filed on Jun. 24, 2019.

(51) Int. Cl.
*H04W 72/04* (2009.01)
*H04W 64/00* (2009.01)
*G01C 19/00* (2013.01)
*G01S 19/01* (2010.01)
*H04W 24/10* (2009.01)

(52) U.S. Cl.
CPC .......... *H04W 72/048* (2013.01); *G01C 19/00* (2013.01); *G01S 19/01* (2013.01); *H04W 24/10* (2013.01); *H04W 64/006* (2013.01); *H04W 72/046* (2013.01)

(58) Field of Classification Search
CPC . H04W 72/046; H04W 72/048; H04W 24/10; H04W 64/006; G01C 19/00; G01S 19/01; H04B 7/0695; H04B 7/088
See application file for complete search history.

(56) References Cited

U.S. PATENT DOCUMENTS

| 2007/0265020 A1* | 11/2007 | Cuffaro | G01S 5/12 |
| | | | 455/456.5 |
| 2010/0159845 A1* | 6/2010 | Kaaja | H04B 7/088 |
| | | | 455/70 |
| 2013/0040655 A1* | 2/2013 | Keidar | H01Q 1/246 |
| | | | 455/456.1 |

(Continued)

FOREIGN PATENT DOCUMENTS

| EP | 3509228 A1 | 7/2019 |
| WO | WO-2018117693 A1 | 6/2018 |

OTHER PUBLICATIONS

International Search Report and Written Opinion—PCT/US2020/039284—ISA/EPO—dated Sep. 30, 2020.

*Primary Examiner* — Siu M Lee
(74) *Attorney, Agent, or Firm* — Qualcomm Incorporated (57) ABSTRACT

Sensor assisted beam management system and methods for mobile User Equipment (UEs) are disclosed. An embedded rotation sensor may be used to determine orientation, rotating direction and angular speed of the UE. A speed sensor and GPS may also be used to determine location, moving direction and speed of the UE. The sensor outputs may be used by the UE to efficiently select UE beams after movement or to predict when a UE beam should be updated. Beam search and measurement periodicities may also be updated based on UE movements reported by the sensors.

31 Claims, 8 Drawing Sheets

(56) References Cited

U.S. PATENT DOCUMENTS

| | | | |
|---|---|---|---|
| 2015/0054975 A1* | 2/2015 | Emmett | H04N 5/23245 |
| | | | 348/220.1 |
| 2018/0191890 A1* | 7/2018 | Ham | G08C 23/04 |
| 2018/0279213 A1 | 9/2018 | Raghavan et al. | |
| 2019/0037530 A1* | 1/2019 | Han | H04W 64/006 |
| 2020/0120458 A1* | 4/2020 | Aldana | H04W 72/048 |
| 2020/0349873 A1* | 11/2020 | Nahum | G09G 3/001 |

\* cited by examiner

SENSOR ASSISTED BEAM MANAGEMENT

CLAIM OF PRIORITY UNDER 35 U.S.C. § 119

The present application claims priority to U.S. Provisional Patent Application Ser. 62/865,700 entitled "SENSOR ASSISTED BEAM MANAGEMENT" filed on Jun. 24, 2019 which is incorporated herein in its entirety.

BACKGROUND

The following relates generally to wireless communication, and more specifically to beam management in wireless communication systems.

Wireless communications systems are widely deployed to provide various types of communication content such as voice, video, packet data, messaging, broadcast, and so on. These systems may support communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., Long Term Evolution (LTE) system, or a New Radio (NR) system). A wireless multiple-access communications system may include base stations (e.g., a gNB or eNB) or other access network nodes, each simultaneously supporting communication for multiple communication devices, which may be otherwise known as user equipment (UE).

In some wireless systems, base stations and UEs may communicate using directional millimeter wave transmissions (e.g., beams), where beamforming techniques may be applied using one or more antenna arrays or panels to generate beams in different directions. Directional millimeter wave transmissions are expected to be utilized by many 5G compliant devices such as UEs. In many instances, UEs will need to use directional beams for communicating with base stations. UE mobility (movement) makes beam management challenging as rotational and translation movement of the UE may result in link dropouts or changes in signal quality requiring a change in the directional beams utilized. Conventional beam management algorithms often utilize a significant amount of UE power since sudden movement may require initiation of a full beam search. Conventional Round Robin type beam searches create latencies and consume power.

Accordingly, there is a need for apparatuses and methods for UEs to quickly identify new directional beams to maintain communication with the base station. Moreover there is a need to reduce the power requirements of conventional beam searches.

SUMMARY

In an exemplary aspect, a User Equipment (UE), comprises a transmitter or receiver adapted to transmit or receive on a directional beam; and a sensor coupled with the transmitter or receiver, the sensor adapted to provide information about UE movement to the transmitter or receiver In another exemplary aspect, a User Equipment (UE), comprises means for transmitting or receiving on a directional beam; and means for providing information about UE movement to a transmitter or a receiver.

In yet another exemplary embodiment a method of beam management comprises: determining information about UE movement using a sensor; and using the information about UE movement to determine one or more directional transmit or receive beams.

In a further exemplary embodiment, a non-transitory computer readable medium storing computer executable code comprising code for controlling a receiver, transmitter and/or processor to receive information about UE movement from a sensor; and use the information about UE movement to determine one or more directional transmit or receive beams In a further exemplary embodiment, non-transitory computer readable medium storing computer executable code has code for controlling a transmitter or receiver to transmit or receive on a directional beam and receiving information about UE movement such as speed, location and rotation. The UE may use the information about the UE movement to search for a transmit or receive beam or switch to another transmit or receive beam or adjust a search or a measurement periodicity.

DETAILED DESCRIPTION

Millimeter wave communication systems often makes use of directional beams to overcome high propagation losses. Directional beams, such as Channel State Information-Reference Signal (CSI-RS) beams and Synchronization Side Band (SSB) beams, may be formed by the UE. Directional beams such as pseudo-omni UE beams and directional UE beams may be formed by the gNB. Beam management algorithms in the UE and gNB determine appropriate directional beams to be used by the gNB and the UE. UE beam management at the UE is especially difficult because of UE mobility. Communication links using directional beams are frequently broken requiring new beam searches. Directional links may also experience significant signal degradation as a result of mobility. UEs may experience loss in Reference Signal Receive Power (RSRP) signaling that a change in directional beam should be made. UE beam management algorithms are therefore resilient and make use of periodic RSRP measurements and periodic beam searches. These periodic RSRP measurements and beam searches limit sleep times making long connected mode discontinuous reception (cDRX) impractical in many instances. Frequent RSRP measurements and beam searches also limit throughput efficiency and increase system latency.

Beam management algorithms may be made more efficient and flexible by introducing sensor inputs to the beam search algorithms. A rotation sensor, for example, may be used to determine UE orientation, rotating direction and/or angular speed of the UE. A speed sensor and GPS processor may also be used to determine UE location, direction and/or speed.

Beam algorithms may exploit information provided by the rotation sensor to make RSRP measurement and beam searches more flexible and resilient. The UE may for example adjust its search or measurement periodicity according to the rotation sensor measurements. If the rotation sensor senses high rotation dynamics, the UE may increase its search and measurement periodicity. If the rotation sensor senses low dynamics, it may decrease its search and measurement periodicity, decreasing power requirements and increasing throughput efficiency. Rotation sensor measurements may be compared with thresholds to determine its search and measurement periodicity.

Beam algorithms may also use the rotation sensor to predict the best transmit or receive beam to use after rotation. The UE may then switch to the best transmit or receive beam without the need to do a new beam search. It can be appreciated that with a rotation sensor, the UE can sleep or CDRX for much longer time periods. Without the sensor, when a UE sleeps for a significant time period and there is a significant angular position change, the UE may need to do a full beam search. Whereas, with the beam sensor, the UE may predict the best beam or estimate the direction of a good beam and do an abbreviated beam search of beams in that general direction. Rotation measurements such as higher dynamic and lower dynamic may be compared with thresholds to determine whether an abbreviated beam search is appropriate or the type of abbreviated beam search to perform.

The speed sensor and GPS processor may also be used to improve UE beam management algorithms. Beam algorithms with location and speed information may determine the translational dynamics of the UE and adjust their search and measurement periodicity accordingly. For higher dynamic scenarios the UE may adjust its search and measurement periodicity higher and for lower dynamic scenarios the UE may adjust its search and measurement periodicity lower. Knowledge of speed and location may also allow the UE to enjoy longer sleep or cDRX times since the UE may predict the new best beam based on sensor measurements. Path loss estimation may also be used to determine distance to the gNB allowing the UE to predict the new beam geometry and select the best transmit and/or receive beam.

Figure 1:
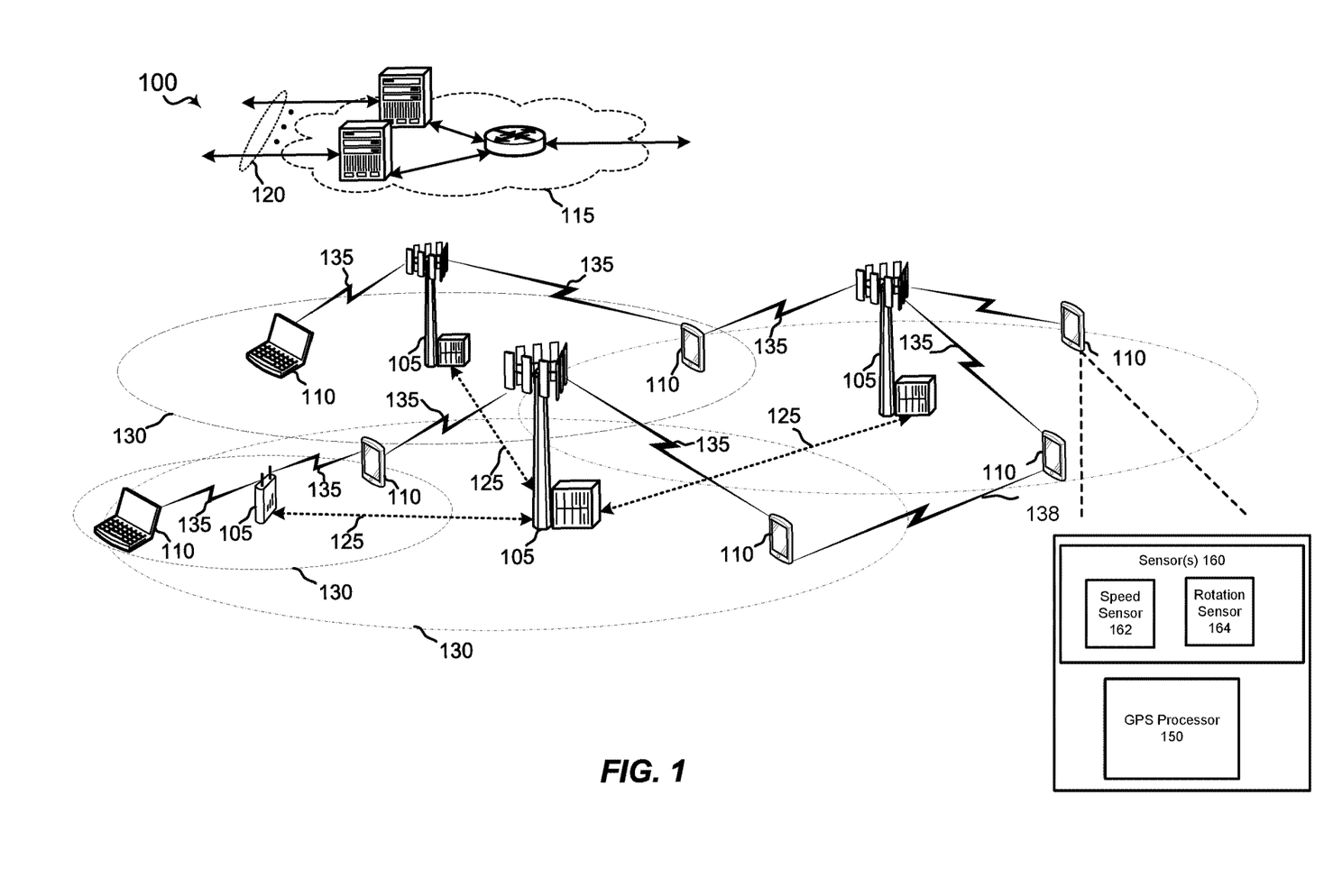
FIG. 1 illustrates an example of a system for wireless communication that supports UE sensor assisted beam management in accordance with aspects of the present disclosure.

FIG. 1 illustrates an example of a system for wireless communication that supports UE sensor assisted beam management in accordance with aspects of the present disclosure. The wireless communications system 100 includes base stations 105, UEs 110, and a core network 115. In some examples, the wireless communications system 100 may be a Long-Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may support the use of a difference in transmit and receive array gains for the calculation of an uplink transmit power.

Base stations 105 may wirelessly communicate with UEs 110 via one or more base station antennas. Each base station 105 may provide communication coverage for a respective geographic coverage area 130. Communication links 135 shown in wireless communications system 100 may include uplink transmissions from a UE 110 to a base station 105, or downlink transmissions, from a base station 105 to a UE 110. Other communication links such as device to device communication link 138 may be a direct UE 110 to UE 110 link. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 110 may be dispersed throughout the wireless communications system 100, and each UE 110 may be stationary or mobile. A UE 110 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 110 may also be able to communicate directly with other UEs (e.g., using a peer-to-peer (P2P) or device-to-device (D2D) protocol). One or more of a group of UEs 110 utilizing D2D communications may be within the coverage area 130 of a cell. Other UEs 110 in such a group may be outside the coverage area 130 of a cell, or otherwise unable to receive transmissions from a base station 105. In some cases, groups of UEs 110 communicating via D2D communications may utilize a one-to-many (1:M) system in which each UE 110 transmits to every other UE 110 in the group. In some cases, a base station 105 facilitates the scheduling of resources for D2D communications. In other cases, D2D communications are carried out independent of a base station 105. UE 110 may transmit Sounding Reference Signal (SRS) and receive SRS allowing for UE 110 to discover neighboring UEs.

Some UEs 110, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 110 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 115 and with one another. For example, base stations 105 may interface with the core network 115 through backhaul links (e.g., S1, etc.). Base stations 105 may communicate with one another over backhaul links (e.g., X2, etc.) either directly or indirectly (e.g., through core network 115). Backhaul links may be wired or unwired. Base stations 105 may perform radio configuration and scheduling for communication with UEs 110 or may operate under the control of a base station controller (not shown). In some examples, base stations 105 may be macro cells, small cells, hot spots, or the like. Base stations 105 may also be referred to as gNBs.

A base station 105 may be connected by an S1 interface to the core network 115. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 110 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 115 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 110 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 5 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 110 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 110 (e.g., for directional beamforming). However, EHF transmissions may be subject to even greater atmospheric attenuation and shorter range than UHF transmissions.

Wireless communications system 100 may support mmW communications between UEs 110 and base stations 105 and in backhaul links. Devices operating in mmW or EHF bands may have multiple antennas to allow beamforming. That is, a base station 105 may use multiple antennas or antenna arrays to conduct beamforming operations for directional communications with a UE 110. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 110). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 110), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 110. Signals may be transmitted multiple times in different directions (e.g., each transmission may be beamformed differently). A mmW receiver (e.g., a UE 110) may try multiple beams (e.g., antenna subarrays) while receiving the synchronization signals.

In some cases, the antennas of a base station 105 or UE 110 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 110.

In some cases, wireless communications system 100 may be a packet-based network that operate according to a layered protocol stack. In the user plane, communications at the bearer or Packet Data Convergence Protocol (PDCP) layer may be IP-based. A radio link control (RLC) layer may in some cases perform packet segmentation and reassembly to communicate over logical channels. A medium access control (MAC) layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a UE 110 and a network device or core network 115 supporting radio bearers for user plane data. At the physical (PHY) layer, transport channels may be mapped to physical channels.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 110 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 110 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 110 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

A UE 110 attempting to access a wireless network may perform an initial cell search by detecting a primary synchronization signal (PSS) from a base station 105. The PSS may enable synchronization of slot timing and may indicate a physical layer identity value. The UE 110 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. After receiving the PSS and SSS, the UE 110 may receive a master information block (MIB), which may be transmitted in a physical broadcast channel (PBCH) by the base station 105. The MIB may contain system bandwidth information, a system frame number (SFN), and a physical HARQ indicator channel (PHICH) configuration.

After decoding the MIB, the UE 110 may receive one or more system information blocks (SIBs). For example, SIB1 may contain cell access parameters and scheduling information for other SIBs. For instance, SIB1 access information, including cell identity information, and it may indicate whether a UE 110 is allowed to camp on a coverage area 130. SIB1 also includes cell selection information (or cell selection parameters) and scheduling information for other SIBs, such as SIB2. Decoding SIB1 may enable the UE 110 to receive SIB2, where SIB2 may contain radio resource control (RRC) configuration information related to random access channel (RACH) procedures, paging, physical uplink control channel (PUCCH), physical uplink shared channel (PUSCH), power control, SRS, and cell barring. Different SIBs may be defined according to the type of system information conveyed. In some cases, SIB2 may be scheduled dynamically according to information in SIB1, and includes access information and parameters related to common and shared channels.

After the UE 110 decodes SIB2, it may transmit a RACH preamble to a base station 105. For example, the RACH preamble may be randomly selected from a set of 64 predetermined sequences. This may enable the base station 105 to distinguish between multiple UEs 110 trying to access the system simultaneously. The base station 105 may respond with a random access response that provides an uplink resource grant, a timing advance, and a temporary cell radio network temporary identifier (C-RNTI). The UE 110 may then transmit an RRC connection request along with a temporary mobile subscriber identity (TMSI) (e.g., if the UE 110 has previously been connected to the same wireless network) or a random identifier. The RRC connection request may also indicate the reason the UE 110 is connecting to the network (e.g., emergency, signaling, data exchange, etc.). The base station 105 may respond to the connection request with a contention resolution message addressed to the UE 110, which may provide a new C-RNTI. If the UE 110 receives a contention resolution message with the correct identification, it may proceed with RRC setup. If the UE 110 does not receive a contention resolution message (e.g., if there is a conflict with another UE 110), the UE 110 may repeat the RACH process by transmitting a new RACH preamble.

Wireless devices in wireless communications system 100 may send transmissions in accordance with a certain link budget. The link budget may account for allowed signal attenuation between a UE 110 and a base station 105, as well as antenna gains at the UE 110 and base station 105. Accordingly, the link budget may provide, for example, a maximum transmit power for the various wireless devices within wireless communications system 100. In some cases, a UE 110 may coordinate transmit power with a serving base station 105 to mitigate interference, improve the uplink data rate, and prolong battery life.

Some of the UEs 110 may have a Global Position System processor 150 for determining position. Some UEs may also have embedded sensors 160 such as a speed sensor 162 and a rotation sensor 164. These UEs may use the outputs of the GPS processor 150 and the sensors 160 for beam management. The rotation sensor 164 may be used to determine UE orientation, rotating direction and angular speed for example. The GPS processor 150 and rotation sensor 164 may be used for determining location, direction and speed. These outputs may be used for beam management. For example, with the knowledge of rotating angular speed, the UE may adjust its search measurement periodicity accordingly. The UE may also use the angular speed to predict UE gNB beam pairs after rotation. Accurate beam prediction may reduce the need for time consuming beam searches reducing latency and power use.

Figure 2:
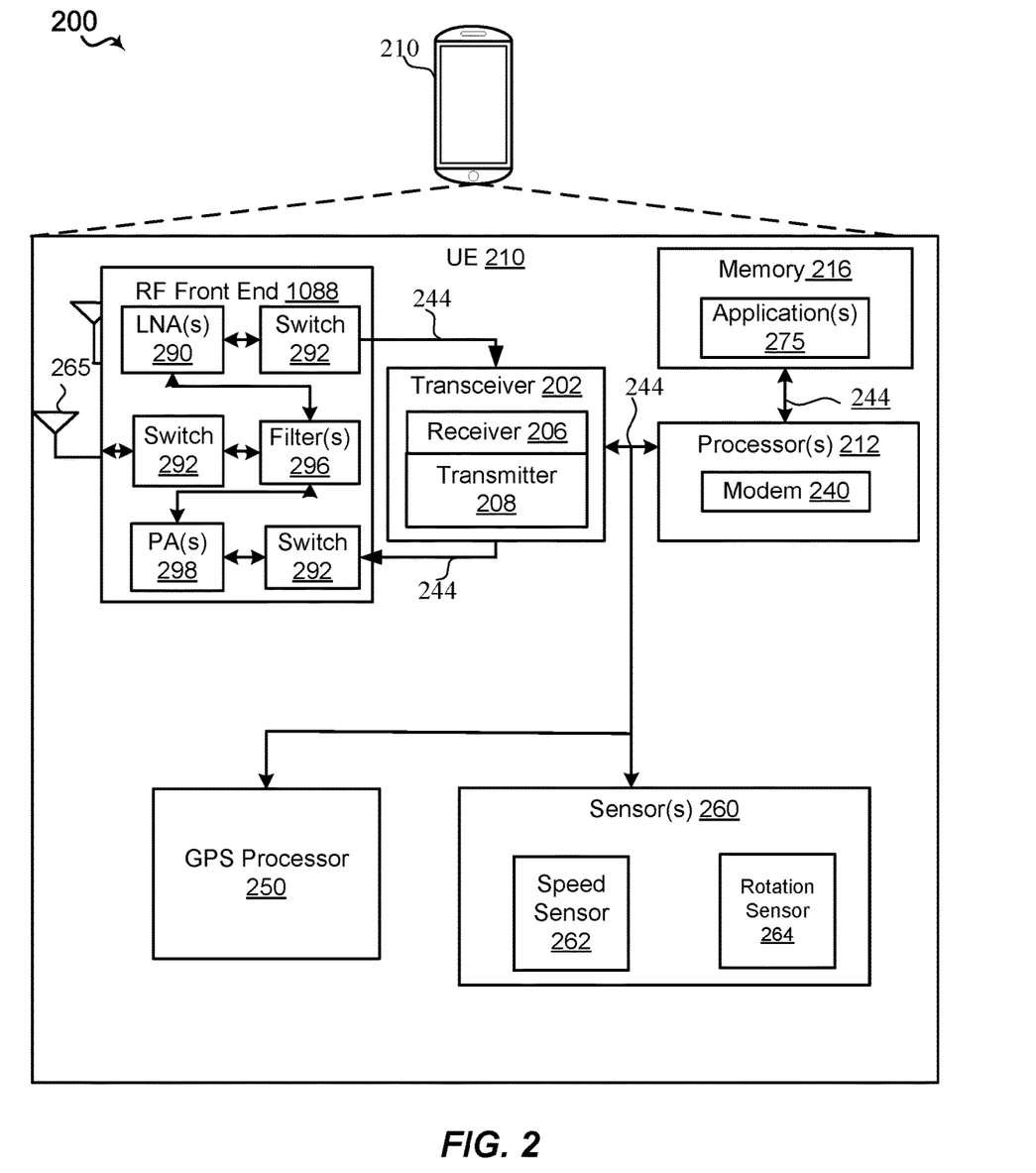
FIG. 2 illustrates an example of a UE in accordance with aspects of the present disclosure.

FIG. 2 illustrates an example of a UE in accordance with aspects of the present disclosure. The UE 210 may be one of the UEs shown in FIG. 1. It may include a variety of components, some of which have already been described above, but including components such as one or more processors 212 and memory 216 and transceiver 202 in communication via one or more buses 244, which may operate in conjunction with modem 240 and a direct link component to enable one or more of the functions described herein related sensor assisted beam management. In other aspects some of the functions of modem 240 may be performed by other processors 212. The transmit component 244 and receive component 262 may be used to perform beam management functions assisted by sensors. Further, the one or more processors 212, modem 240, memory 216, transceiver 202, RF front end 288 and one or more antennas 265, may be configured to support voice and/or data calls (simultaneously or non-simultaneously) in one or more radio access technologies as well as radar.

In an aspect, the one or more processors 212 can include a modem 240 that uses one or more modem processors. The various functions related to beam management may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with modem 240 may performed by transceiver 202.

Also, memory 216 may be configured to store data used herein and/or local versions of applications 275 or the beam management and/or one or more of its subcomponents being executed by at least one processor 212. Memory 216 can include any type of computer-readable medium usable by a computer or at least one processor 212, such as random-access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining radar component and/or one or more of its subcomponents, and/or data associated therewith, when UE 210 is operating at least one processor 212.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station. Additionally, receiver 206 may process such received signals, including SRS, and also may obtain measurements of the signals, such as, but not limited to, Ec/Io, SNR, RSRP, RSSI, etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 210 may include RF front end 288, which may operate in communication with one or more antennas 265 and transceiver 202 for receiving and transmitting radio transmissions, for example, wireless communications transmitted by at least one base station or wireless transmissions transmitted by UE. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 1098. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE can communicate with, for example, one or more base stations or one or more cells associated with one or more base stations. In an aspect, for example, modem 240 can configure transceiver 202 to operate at a specified frequency and power level based on the UE configuration of the and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with as provided by the network during cell selection and/or cell reselection.

In an aspect UE 210 may have embedded sensors 260 such as a speed sensor 262 and a rotation sensor 264. UE 210 may use the outputs of the GPS processor 250 and the sensors 260 for beam management. The rotation sensor 264 may be used to determine UE orientation, rotating direction and angular speed for example. The GPS processor 250 and rotation sensor 264 may be used for determining location, direction and speed. The outputs may be used for beam management. For example, with the knowledge of rotating angular speed, the UE may adjust its search measurement periodicity accordingly. The UE may also use the angular speed to predict UE gNB beam pairs after rotation. Accurate beam prediction may reduce the need for time consuming beam searches reducing latency and power use.

Sensor outputs 260 and GPS processor 250 outputs may be processed by the modem 240 or other processor(s) 212 for use by transceiver 202. A beam management algorithm for use by receiver 206 or transmitter 208 may use the sensor outputs 260 or GPS processor 250 outputs for beam management functions. The beam management algorithm may be embedded in the transceiver 202, the modem 240, or any other suitable processor 212.

Figure 3:
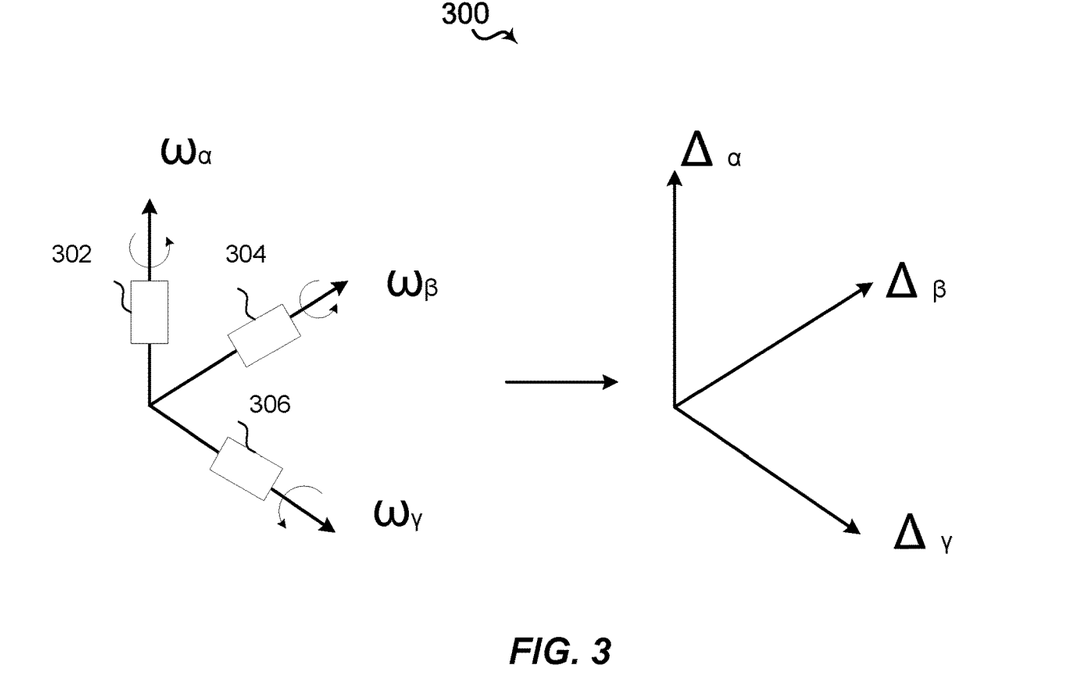
FIG. 3 illustrates an example of a rotation sensor in accordance with aspects of the present disclosure.

FIG. 3 illustrates an example of a rotation sensor in accordance with aspects of the present disclosure. The rotation sensor may be embedded in a UE such as the UE shown in FIGS. 1 and 2. The rotation sensor in one exemplary embodiment may be comprised of three silicon gyroscopes substantially orthogonally mounted in the UE. The first gyroscope 302, the second gyroscope 304 and third gyroscope 306 sensing corresponding platform body rotation rates $\omega_\alpha$, $\omega_\beta$, $\omega_\gamma$ of the UE. The UE may integrate the body rotation rates $\omega_\alpha$, $\omega_\beta$, $\omega_\gamma$ over time to determine the change in angular position (orientation) of the UE (i.e $\Delta_\alpha$ $\Delta_\beta$ $\Delta_\gamma$).

In some embodiments an Euler rotation may be utilized to convert platform orientation information from platform coordinate system to an earth based systems. There are many commonly used coordinate systems, such as Earth Centered Earth Fixed (ECEF) and North East Down (NED). The geodetic model for the Earth may also vary. Again, an Euler rotation may be used to convert the attitude information from a first geodetic reference frame (e.g., the World Geodetic System of 1984 (WGS 84)) to a second geodetic reference frame (e.g., the North American Datum of 1927 (NAD 27))

Figure 4:
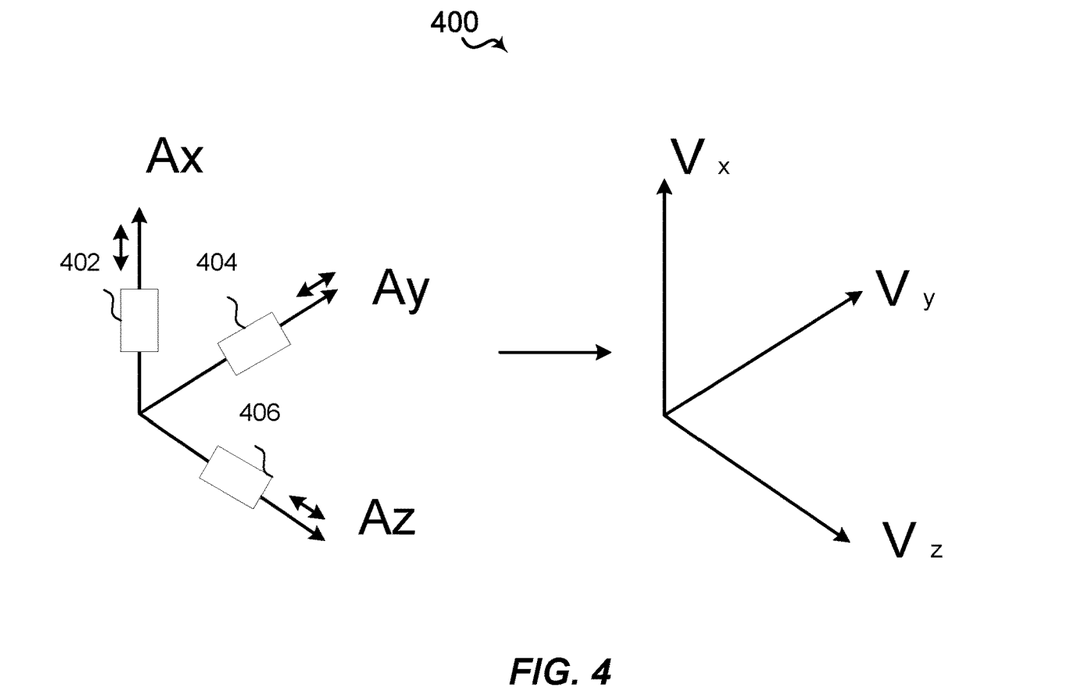
FIG. 4 illustrates an example of a speed and direction sensor in accordance with aspects of the present disclosure.

FIG. 4 illustrates an example of a speed and direction sensor in accordance with aspects of the present disclosure. The speed and direction sensor may be embedded in one of the UEs shown in FIG. 1 or FIG. 2. The speed and direction sensor may be comprised of three orthogonally mounted accelerometers. The first accelerometer 402, the second accelerometer 404 and the third accelerometer 406 sensing platform accelerations Ax Ay and Az of the UE. The UE may integrate the accelerations over time to determine the corresponding platform velocity changes (i.e. Vx, Vy, Vz). Platform velocities may be used to determine speed and direction. A GPS processor (not shown) may be used to determine location from satellite ranging measurements.

In some embodiments an Euler rotation may be utilized to convert platform velocity information from the platform coordinate system to an earth based systems. There are many commonly used coordinate systems, such as Earth Centered Earth Fixed (ECEF) and North East Down (NED) for example. The geodetic model for the Earth may also vary. Again, an Euler rotation may be used to convert the attitude information from a first geodetic reference frame (e.g., the World Geodetic System of 1984 (WGS 84)) to a second geodetic reference frame (e.g., the North American Datum of 1927 (NAD 27))

Figure 5:
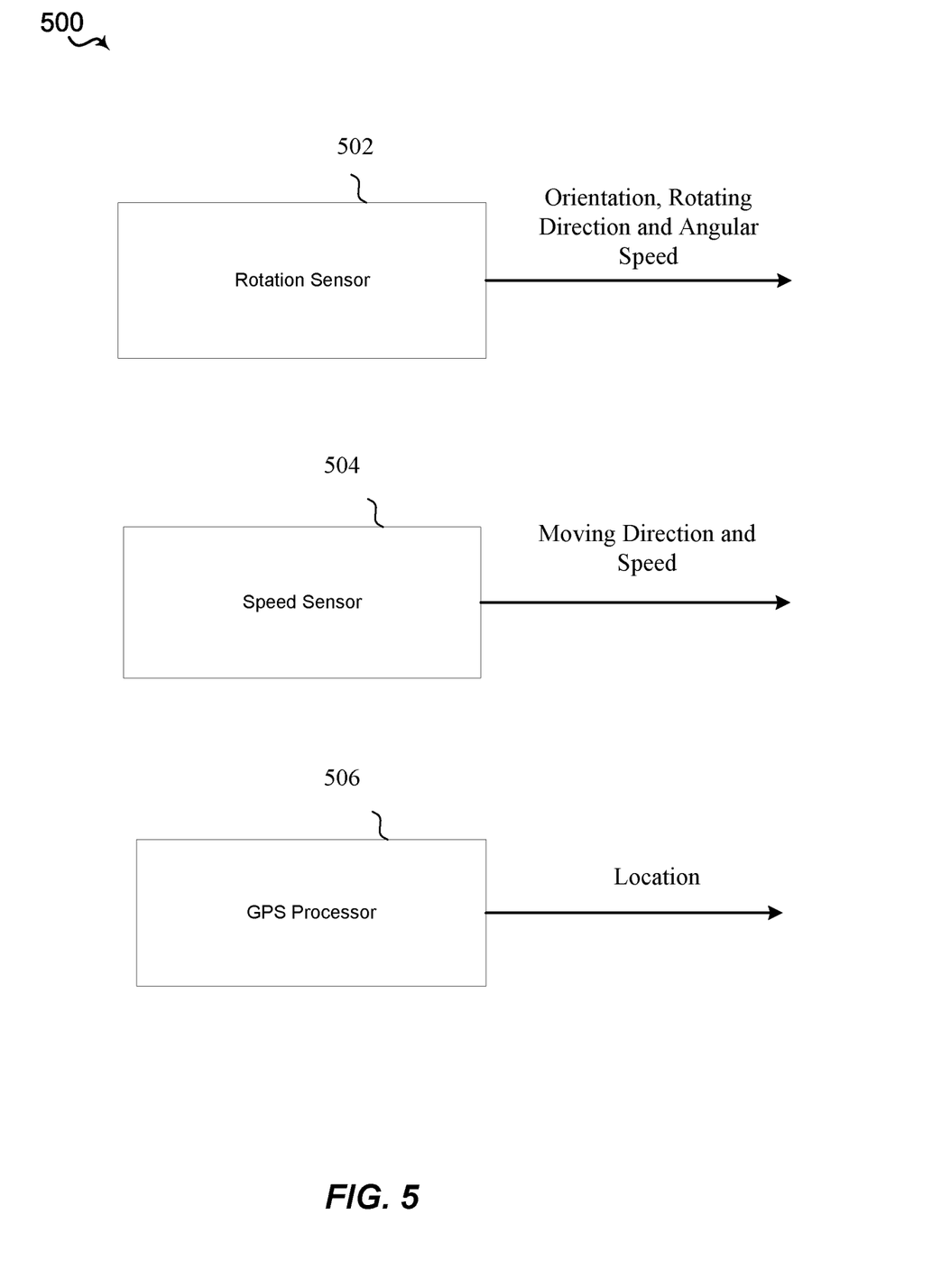
FIG. 5 illustrates a block diagram of sensor outputs in accordance with aspects of the present disclosure.

FIG. 5 illustrates a block diagram of sensor outputs in accordance with aspects of the present disclosure. These sensors may be embedded in the UEs shown in FIG. 1 and FIG. 2. The rotation sensor 502 may output rotation movement information including orientation, rotating direction and angular speed of the UE. The speed sensor 504 may output translation movement information including moving direction and speed. The GPS processor 506 may output location information. The UE may combine the output of all the sensors to create an estimate of the UE state vector.

Figure 6:
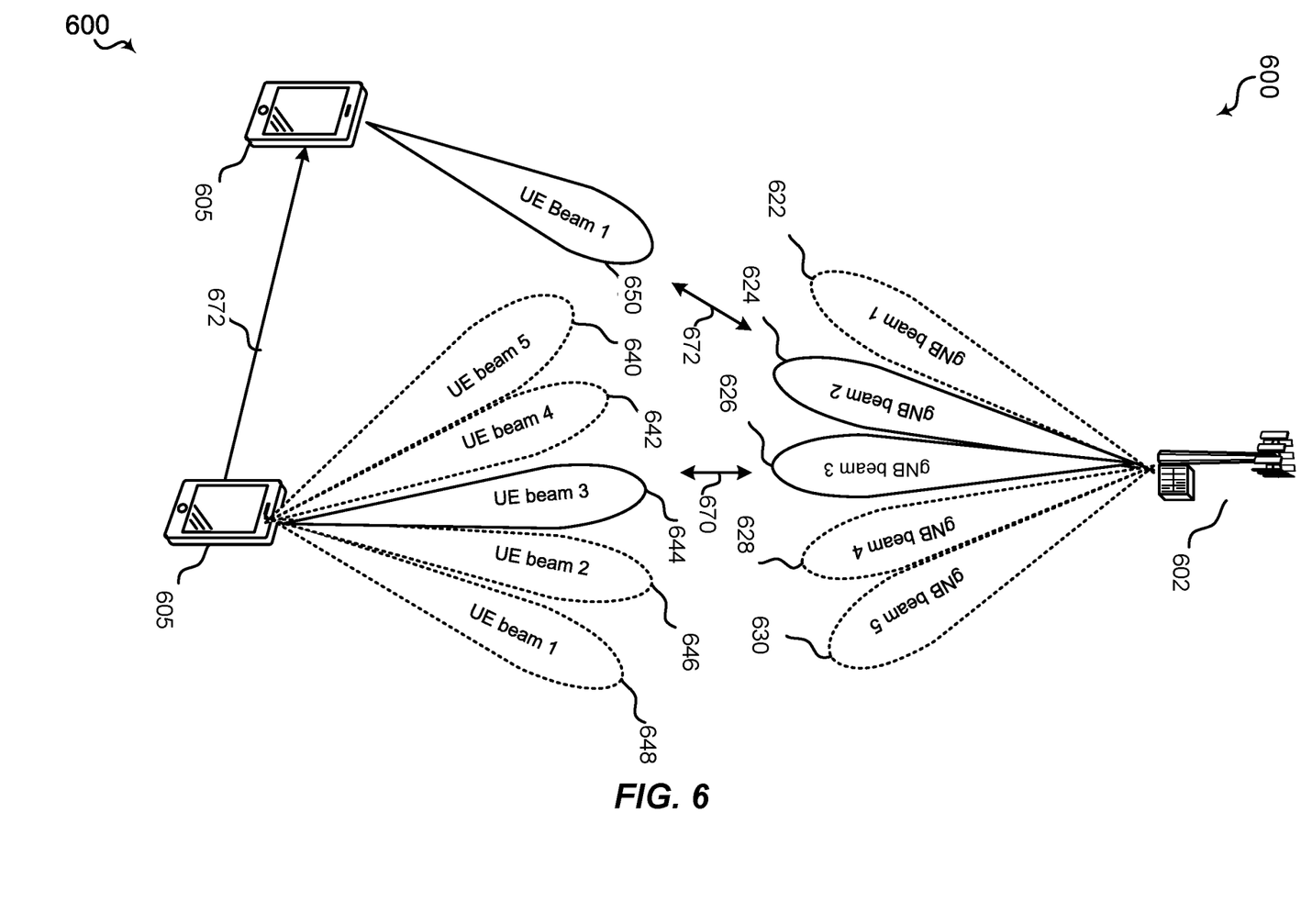
FIG. 6 illustrates an example of a UE in translational motion in accordance with aspects of the present disclosure.

FIG. 6 illustrates an example of a UE 605 in translational motion in accordance with aspects of the present disclosure. The UE 605 may be the same UE as the UE shown in FIGS. 1 and 2 for example. Five representative narrowband beams transmit and/or receive beams are shown for UE 605: UE beam 1 648, UE beam 2 646, UE beam 3 644, UE beam 4 642 and UE beam 5 640. Also shown, are five representative transmit and/or receive beams for gNB 602: gNB 1 622, gNB 2 624; gNB 3 626; gNB 4 628 and gNB 5 630.

As depicted in FIG. 6, initially, UE 605 is in initial communication 670 with gNB 602 using a suitable beam pair. The gNB 602 is using gNB beam 3 626 and the UE is using UE beam 3 644. The UE 605, however in translation motion 672, has moved to a different location over time. During this time the UE 605 may have been sleeping or in cDRX. Using a speed sensor, such as the one shown FIG. 4 and/or FIG. 5, and a GPS processor, such as the one shown in FIG. 5, the UE 205 may now efficiently predict that a new suitable beam for its subsequent communication 672 is now UE beam 1 650. The new suitable beam may be determined by determining the change in relative position of the UE 605 with respect to the gNB 602 and the available beam directions.

Those skilled in the art, will also recognize that distances to the base station may be estimated by pathloss measurements. The UE 650 may make path loss measurements and estimate distances from the UE 650 to the gNB 602 before and after movement. Using the distance estimates and the location of the UE 650 before and after movement the UE may determine the position of the gNB 602. The UE 650 may then use the position of the gNB and the position of the UE 650 to determine that gNB beam 2 624 is a suitable beam for communicating with the UE. Thus after movement, UE beam 1 650 and gNB beam 2 624 are suitable beam pairs.

Thus, the speed sensor inputs and GPS processor allow the beam management algorithm to update beams as the UE moves about the cell. It is apparent that the benefits of the speed sensor may be exploited particularly well in large open area with sporadic data traffic. UE 605 may sleep for significant periods of time and have good knowledge of a suitable beam pairs on awakening. This may mitigate the need for a subsequent beam searches. In cases where the identified suitable beam pair is not optimum, a reduced set beam search may be used instead of a full round-robin beam search. Thus the speed sensor and GPS processor may reduce battery consumption and latency while allowing for greater sleep and cDRX times.

Figure 7:
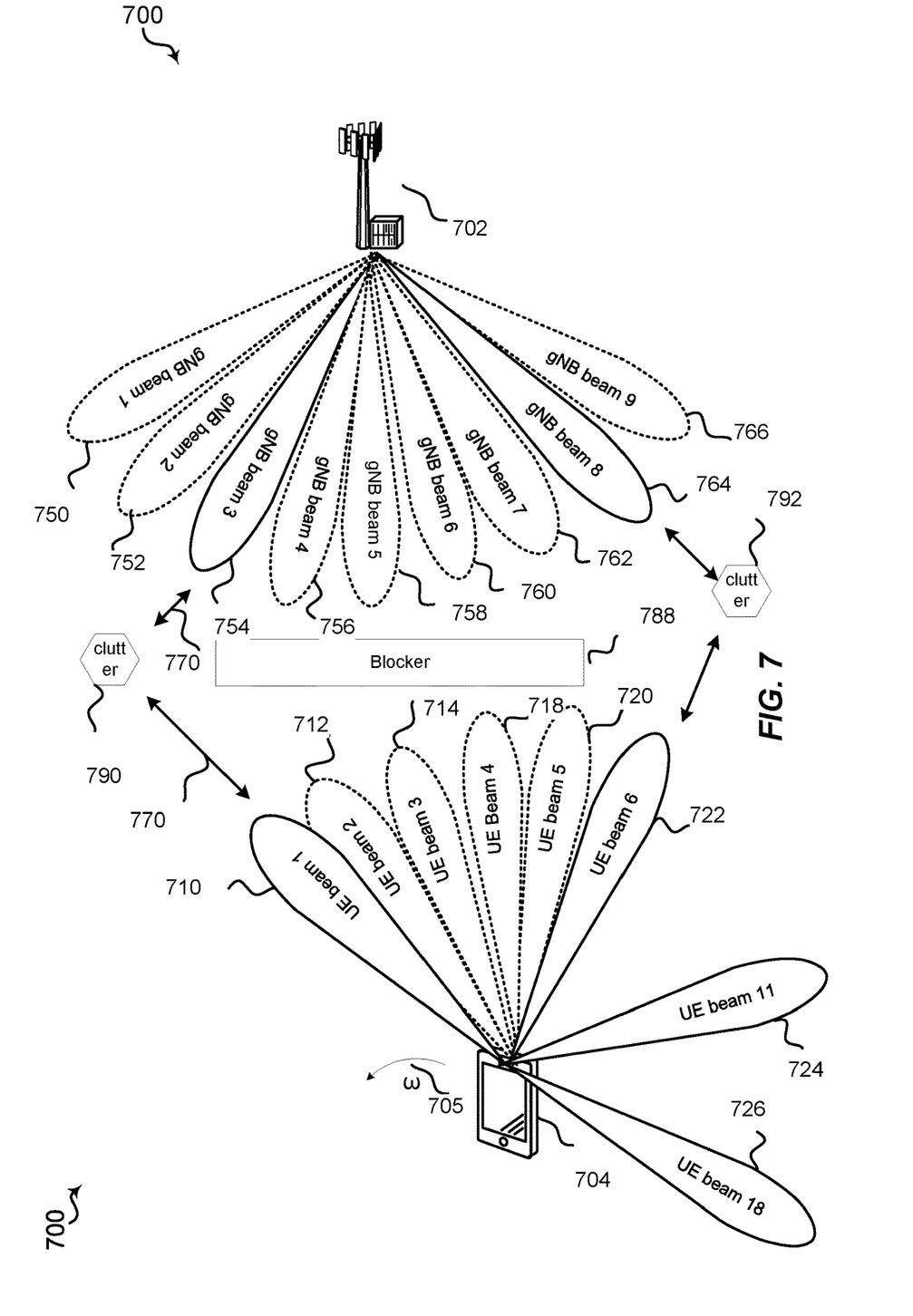
FIG. 7 illustrates an example of a UE rotating in accordance with aspects of the present disclosure.

FIG. 7 illustrates an example of a UE rotating in accordance with aspects of the present disclosure. The UE 705 may be the same UE as one the UEs shown in FIGS. 1 and 2 for example. UE 705 is shown in rotation ω 705, in an environment with clutter and blocking such as an indoor environment. The UE 704 may have an embedded rotation sensor as shown in FIGS. 3 and 5, for example. Shown in FIG. 7 are representative transmit and receive beams for UE 704: UE beam 1 710, UE beam 2 712, UE beam 3 714, UE beam 4 718, UE beam 5 720, UE beam 6 722, UE beam 11 724 and UE beam 18 726. Also shown in FIG. 7 are representative transmit and receive beams for gNB 702: gNB beam 1 750, gNB beam 2 752, gNB beam 3 754, gNB beam 4 756, gNB beam 5 758; gNB beam 6 760, gNB beam 7 762, gNB beam 8 764, gNB beam 9 766. A blocker 788 and clutter 790, 792 are also shown.

Before rotation ω 705, UE 704 is in communication with gNB 702. Due to blocker 788, UE 704 is in communication with gNB 702 with beam pairs that exploit environmental clutter 790, 792 with the communication signals 770 being reflected off the environmental clutter 790, 792. The first suitable beam pair, UE beam 1 710 and gNB beam 3 754 may be used for communication. The second suitable beam UE beam 6 722 and gNB beam 8 may also be used for communication before rotation ω 705.

The UE 705 may be subject to a sudden rotation ω from a quick arm or head movement for example. In this case, data from the angular sensor may be used to determine the change in angular position of the UE 705. With knowledge of the change in angular position the UE may quickly determine new suitable beam pairs. In this example, after rotation, UE beam 11 724, may now be in close to the same position as UE beam 1 710 was before rotation and UE beam 18 726 may now be in the same position as UE beam 6 722 was before rotation. Thus after rotation, a new first suitable beam pair, UE beam 11 724 and gNB beam 3 754, may be used for communication. Similarly after rotation, a new second suitable beam pair UE beam 18 726 and gNB beam 18 764 may also be used for communication. The new suitable beam may be determined by determining the change in angular position of the UE 705 with respect to the gNB 754 and the available beam directions. Those skilled in the art will also recognize that new suitable beam may also be determined based on the change in angular position and the change in relative position of the UE 705 with respect to the gNB 702.

Thus the use of an angular sensor may be used to quickly determine new usable beam pairs. This is of particular value in indoor environments subject to blockage and clutter. Without the use of an angular sensor, a fairly extensive beam search would be required to determine new suitable beam pair resulting in unnecessary battery usage and increased latency.

Those skilled in the art, will readily recognize that the translation sensor shown in FIG. 6 may be combined with the rotational sensor shown in FIG. 7. The use of a single translational and rotational sensor is also contemplated.

Figure 8:
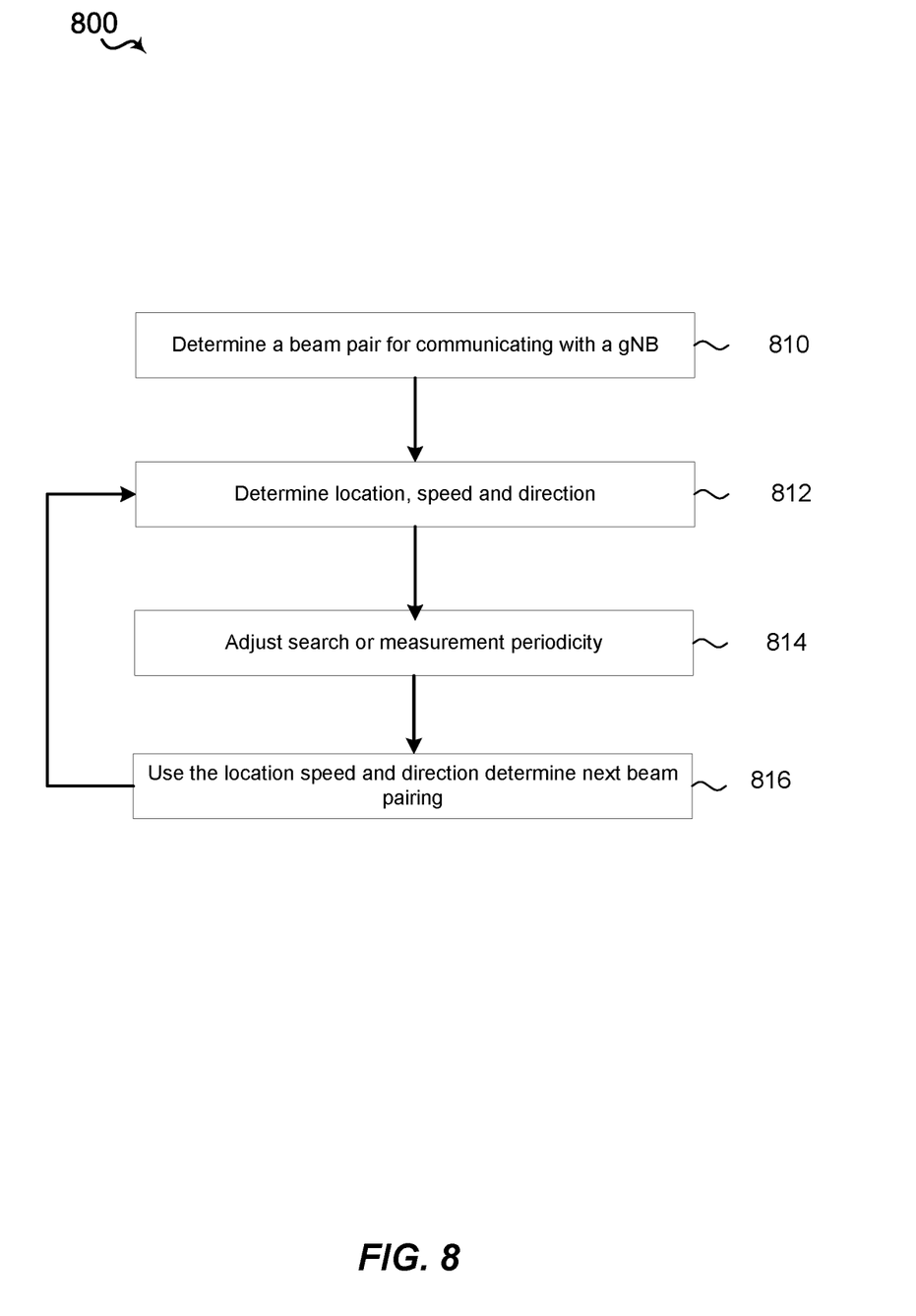
FIG. 8 illustrates an example of a flow diagram for a UE in translation motion performing beam management in accordance with aspects of the present disclosure.

FIG. 8 illustrates an example of a flow diagram for a UE in translation motion performing beam management in accordance with aspects of the present disclosure. The UE may be the same UE as one of the UEs shown in FIGS. 1, 2, 6 and 7 for example. The UE may determine a beam pair for communication with a gNB 810. The UE may determine the beam pair with a beam search procedure for example. The UE may then determine its location, speed and direction 812 of movement. The UE may determine its location, speed and direction with a speed sensor such as the speed sensor shown in FIGS. 4 and 5 for example. The UE may also use a GPS processor like the processor shown in FIG. 6 to determine its location, for example.

The UE may use the location, speed and direction to adjust a search or measurement periodicity 814. For example, for low dynamics, the UE may choose a low measurement and search periodicity. For high dynamics, the UE may choose a high search or measurement periodicity. The UE may also use the location speed and direction to determine the next beam pairing 816. Knowledge of location, speed and direction may allow the UE and its beam management algorithm to predict when a new pairing would provide a more robust communication pairing.

Figure 9:
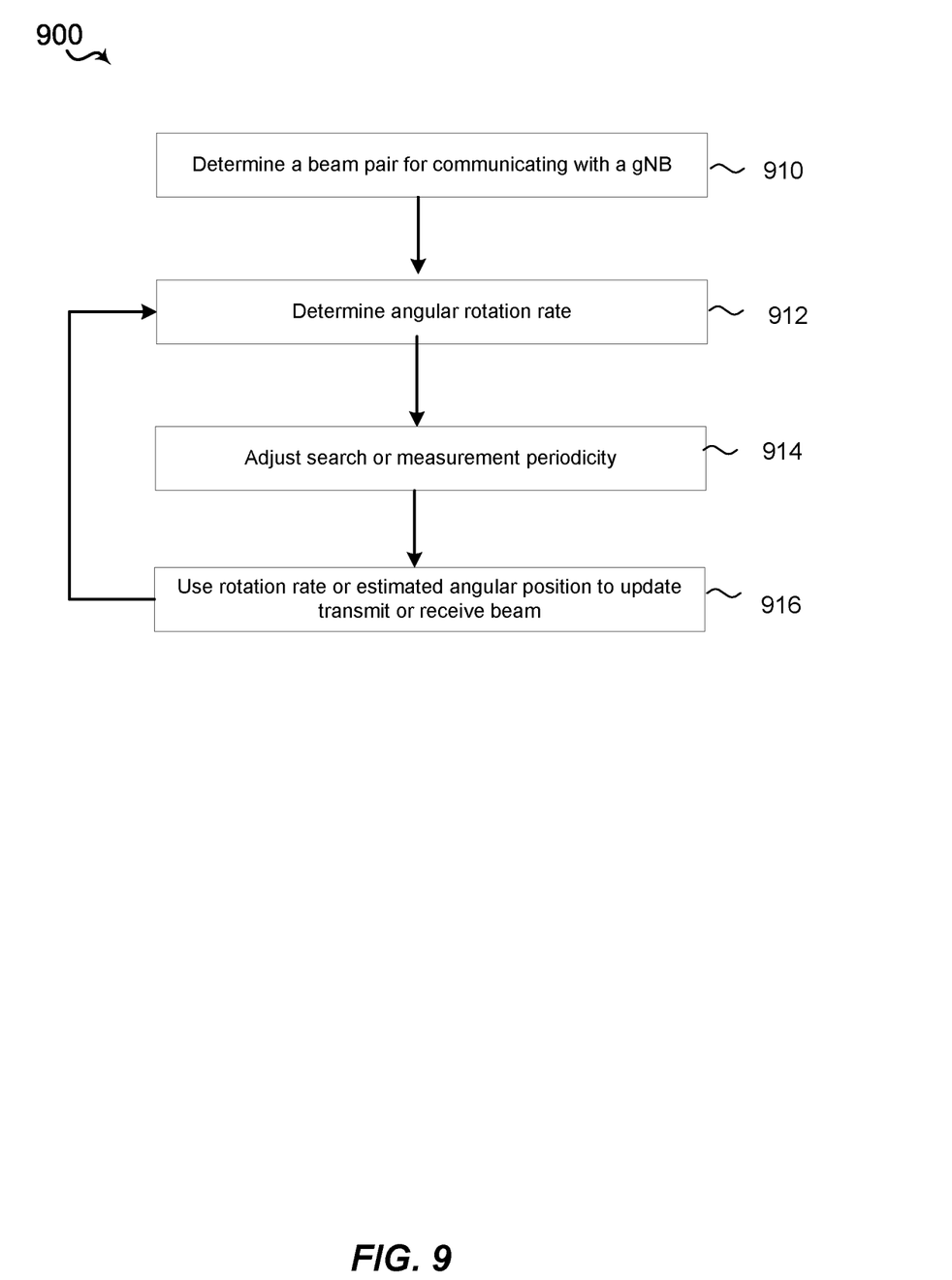
FIG. 9 illustrates an example of a flow diagram for a UE in rotational motion performing beam management accordance with aspects of the present disclosure.

FIG. 9 illustrates an example of a flow diagram for a UE in rotational motion performing beam management accordance with aspects of the present disclosure. The UE may be the same UE as one the UEs shown in FIGS. 1, 2, 6 and 7 for example. The UE may determine an angular rotation rate 912. The UE may determine the angular rotation rate with a rotation sensor like the rotation sensor shown in FIGS. 4 and 5. The angular rotation rate may be used to predict a orientation of the UE. The UE may adjust the search or measurement periodicity 914. For high rotation rates, the UE may choose a high search or measurement periodicity. For a low rotation rates, the UE may choose a low search or measurement periodicity. The UE may then use the rotation rate or estimated rotation rate to update the transmit or receive beam 916.

Those skilled in the art, will readily recognize that the translation flow diagram shown in FIG. 8 may be combined with the rotational flow diagram shown in FIG. 9. The use of a single translational and rotational sensor with a combined flow diagram is also contemplated.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS).

LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

The invention claimed is:

1. A User Equipment (UE), comprising:
 a transmitter or receiver adapted to transmit or receive on a directional beam;
 a sensor coupled with the transmitter or receiver, the sensor adapted to provide information about UE movement to the transmitter or receiver; and
 the transmitter or receiver further adapted to adjust a beam search periodicity or a signal quality measurement periodicity based on the information about the UE movement.

2. The UE of claim 1 wherein the transmitter or receiver is further adapted to use the information about the UE movement to search for a transmit or receive beam via an abbreviated beam sweep.

3. The UE of claim 2 wherein the transmitter or receiver is further adapted to switch to another beam based on the information about the UE movement.

4. The UE of claim 1 wherein the sensor comprises a rotation sensor.

5. The UE of claim 4 wherein the rotation sensor is further adapted to output orientation, rotation direction and angular speed.

6. The UE of claim 1 wherein the sensor comprises a speed sensor.

7. The UE of claim 6 further comprising a Global Position System (GPS) receiver wherein the GPS receiver and sensor are further adapted to provide location, moving direction and speed to the transmitter or receiver.

8. The UE of claim 6 further comprising a rotation sensor.

9. The UE of claim 1 further comprising a processor adapted to determine pathloss before and after the UE movement.

10. The UE of claim 1 further comprising a processor adapted to determine a reduce beam set for a beam search after the UE movement.

11. A User Equipment (UE), comprising:
 means for transmitting or receiving on a directional beam;
 means for providing information about UE movement to a transmitter or a receiver; and
 means for adjusting a beam search periodicity or a signal quality measurement periodicity based on the information about the UE movement.

12. The UE of claim 11 further comprising means for using the information about the UE movement to search for a transmit or receive beam via an abbreviated beam sweep.

13. The UE of claim 12 further comprising means for switching to another beam based on the information about the UE movement.

14. The UE of claim 11 further comprising means for sensing rotation.

15. The UE of claim 14 further comprising means for determining orientation, rotation direction and angular speed.

16. The UE of claim 11 further comprising means for sensing speed.

17. The UE of claim 16 further comprising means for determining location or moving direction.

18. The UE of claim 16 further comprising means for sensing angular position.

19. The UE of claim 11 further comprising means for determining a pathloss before and after the UE movement.

20. The UE of claim 11 further comprising means for determining a reduced beam set for a beam search after the UE movement.

21. A method of beam management comprising:
 determining information about UE movement using a sensor; and
 adjusting a beam search periodicity or a signal quality measurement periodicity based on the information about the UE movement; and
 using the information about the UE movement to determine the one or more directional transmit or receive beams based at least in part on the beam search or the signal quality measurement periodicity.

22. The method of claim 21 further comprising using the information about the UE movement to search for a transmit or receive beam via an abbreviated beam sweep.

23. The method of claim 22 further comprising switching to another beam based on the information about the UE movement.

24. The method of claim 21 wherein the information about the UE movement comprises a rotation information.

25. The method of claim 24 wherein the information about the UE movement comprises orientation, rotation direction and angular speed.

26. The method of claim 21 wherein the information about the UE movement comprises speed.

27. The method of claim 26 wherein the information about the UE movement comprises location and moving direction.

28. The method of claim 26 wherein the information about the UE movement comprises angular position.

29. The method of claim 21 further comprising a processor adapted to determine pathloss before and after the UE movement.

30. The method of claim 21 further comprising a processor adapted to determine a reduce beam set for a beam search after the UE movement.

31. A non-transitory computer readable medium storing computer executable code, comprising code to:
   receive information about UE movement from a sensor; and
   adjust a beam search periodicity or a signal quality measurement periodicity based on the information about the UE movement; and
   use the information about the UE movement to determine the one or more directional transmit or receive beams based at least in part on the beam search or the signal quality measurement periodicity.

* * * * *